United States Patent [19]
von Taschitzki

[11] Patent Number: 5,988,107
[45] Date of Patent: Nov. 23, 1999

[54] WATERER

[75] Inventor: Martin von Taschitzki, Lohmar, Germany

[73] Assignee: Aratowerk Walter von Tashitzki GmbH & Co. KG, Koln, Germany

[21] Appl. No.: 09/119,497

[22] Filed: Jul. 21, 1998

[51] Int. Cl.⁶ .................................................. A01K 1/10
[52] U.S. Cl. ............................................ 119/51.5; 119/72
[58] Field of Search ........................... 119/72, 51.5, 454, 119/464, 475, 477, 515

[56] References Cited

U.S. PATENT DOCUMENTS

| | | | |
|---|---|---|---|
| 3,295,500 | 1/1967 | Blough | 119/51.5 |
| 3,556,057 | 1/1971 | Icking | 119/51.5 |
| 4,019,462 | 4/1977 | Palfalvy | 119/51.5 |
| 4,252,083 | 2/1981 | Gilst et al. | 119/51.5 |
| 4,628,866 | 12/1986 | Israel et al. | 119/51.5 |
| 4,800,844 | 1/1989 | Van Gilst | 119/51.5 |

FOREIGN PATENT DOCUMENTS 2203556  3/1979  Germany ........................ 119/51.5

*Primary Examiner*—Peter M. Poon
*Assistant Examiner*—Judith A. Nelson
*Attorney, Agent, or Firm*—Diller, Ramik & Wight, PC

[57] ABSTRACT

The invention relates to a waterer to be mounted on an animal housing facility, which is provided with an essentially vertical feed delivery pipe (4), a vertical water pipe (2) and at least one water valve (3) fitted on the water pipe (2). It is characterised by a mounting unit (5), at least parially surrounding the feed delivery pipe (4), which can be firmly clamped to the feed delivery pipe (4), and a water pipe holder with a strap (6) and an angled leg (7) provided on the mounting unit (5), where the water pipe (2) lies against the strap (6) and the leg (7) in height-adjustable fashion, and with a height adjustment clamp (8) which surrounds the water pipe (2) and is connected to the strap (6) and the leg (7), with which the strap (6), the leg (7) and the height adjustment clamp (8) can be clamped against the water pipe (2).

12 Claims, 5 Drawing Sheets

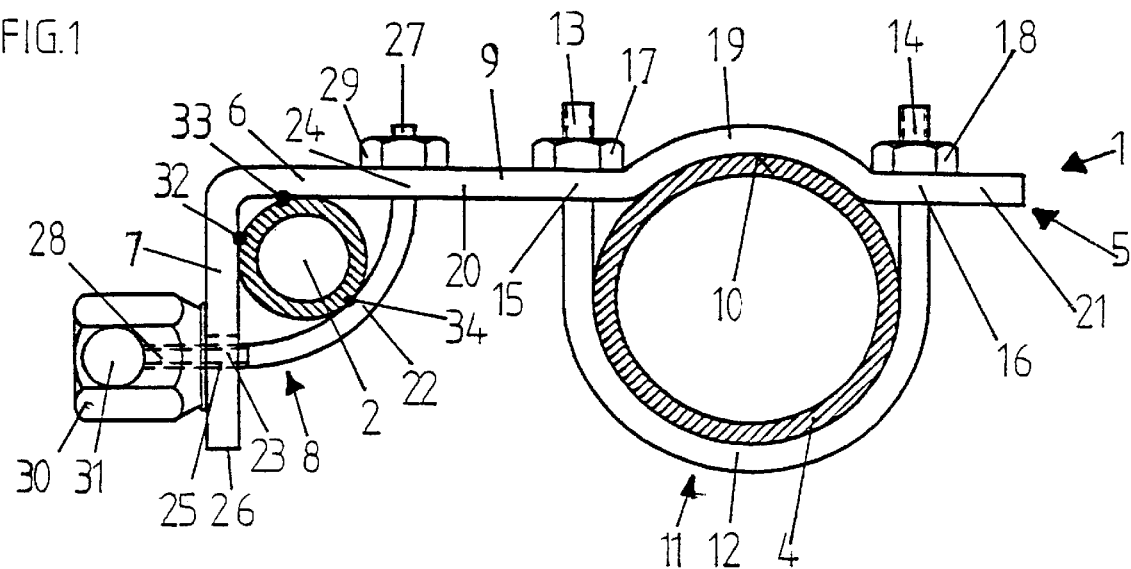
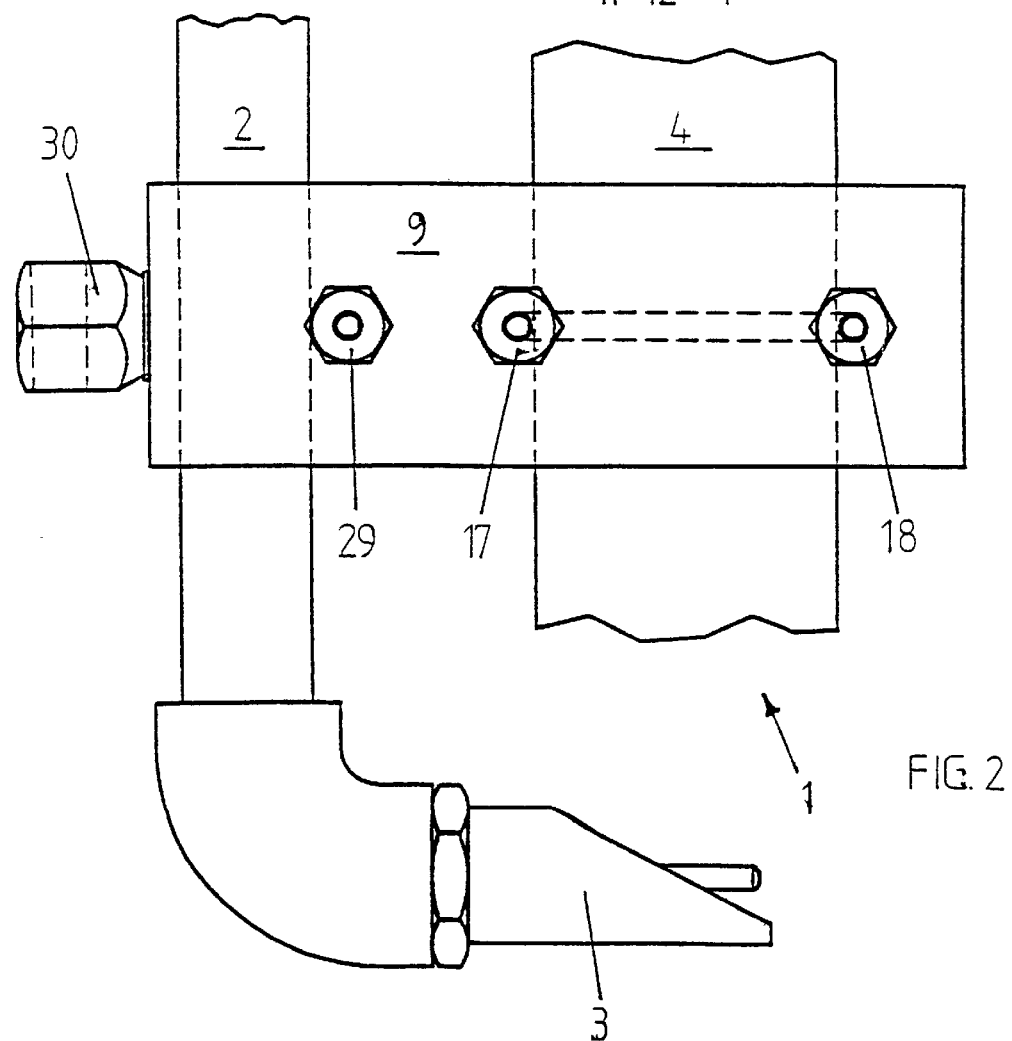

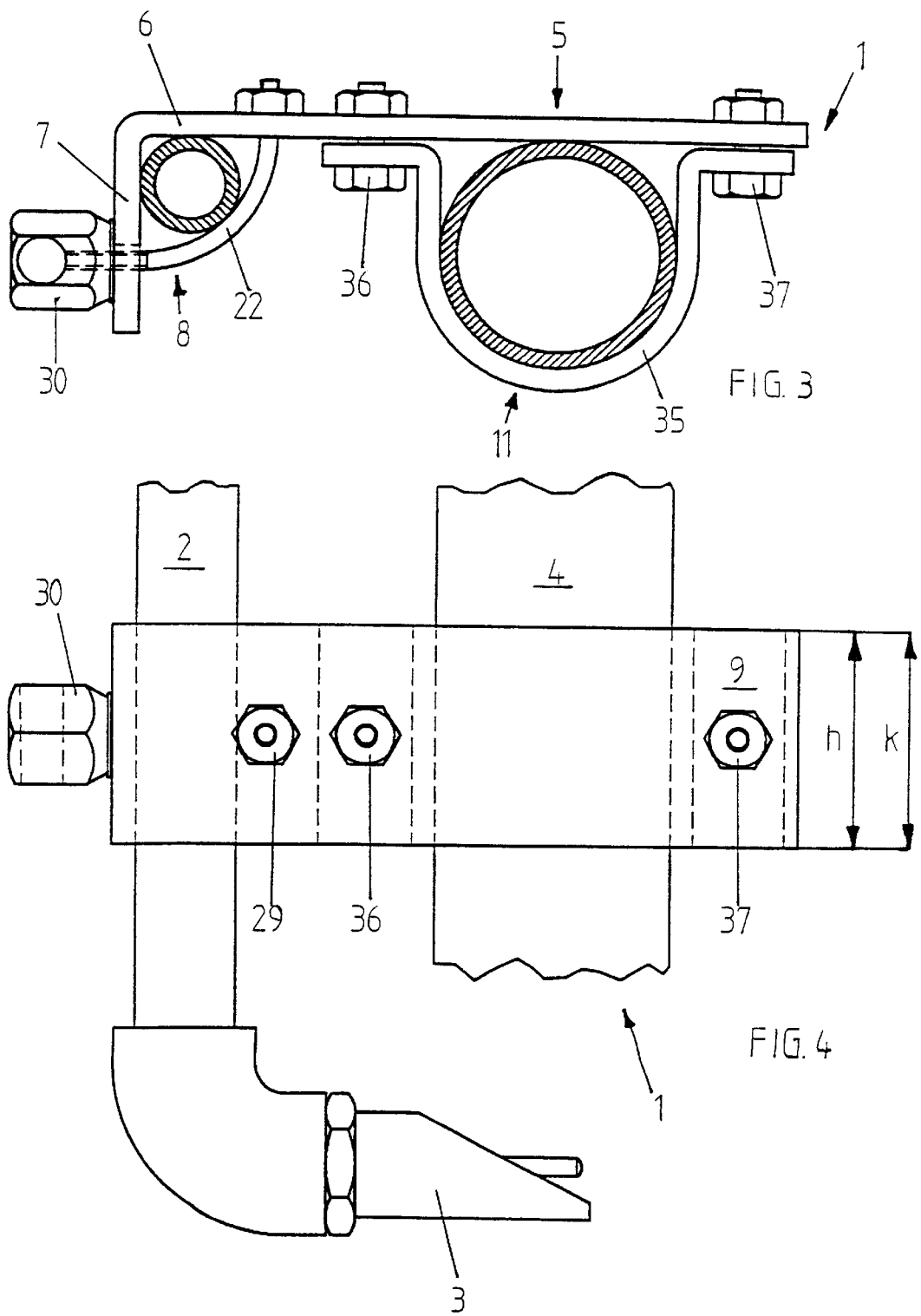

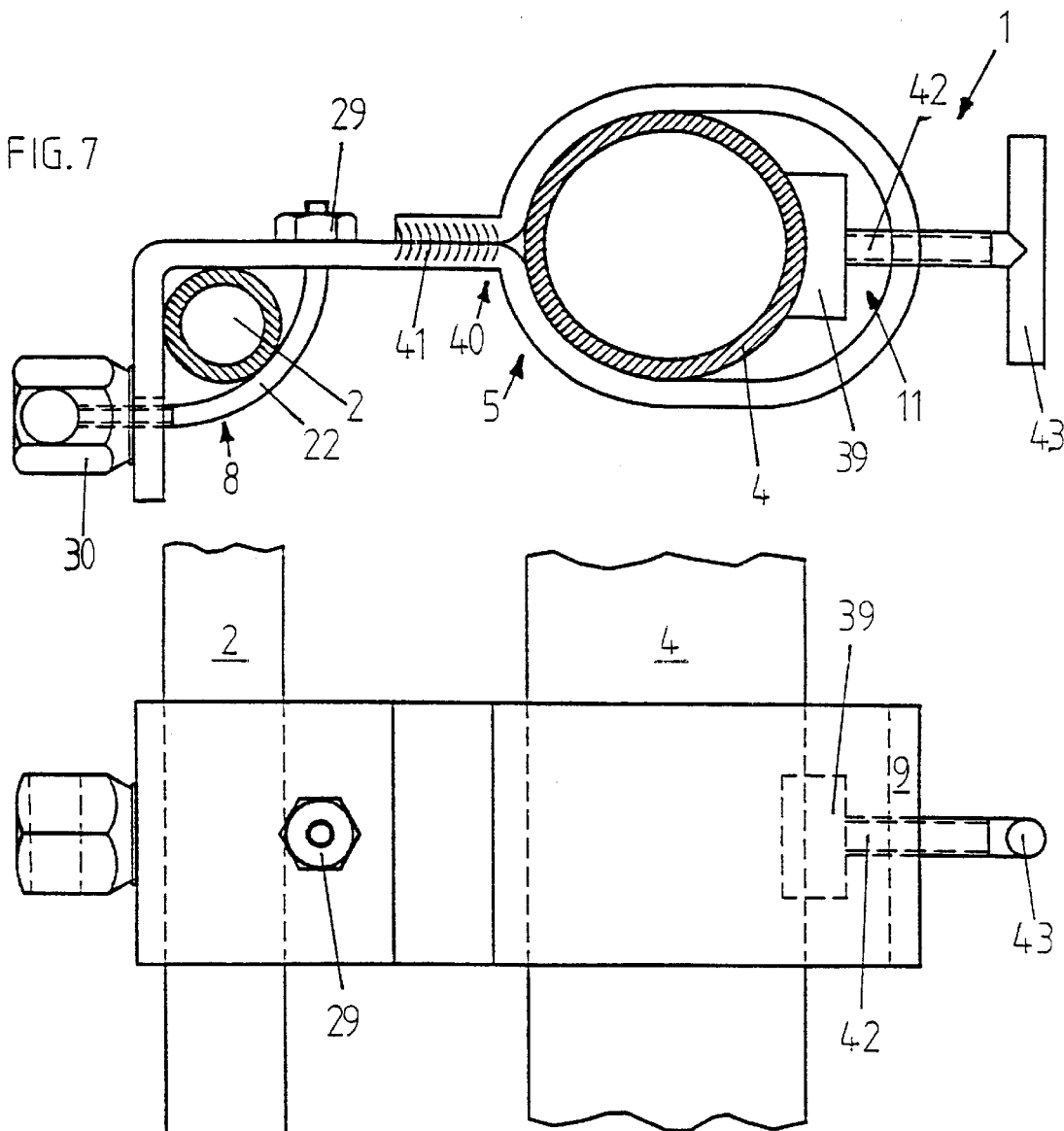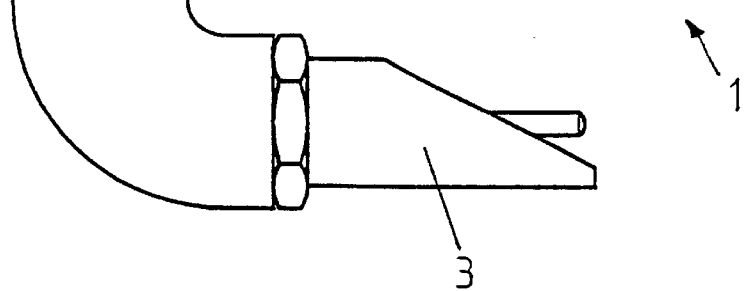

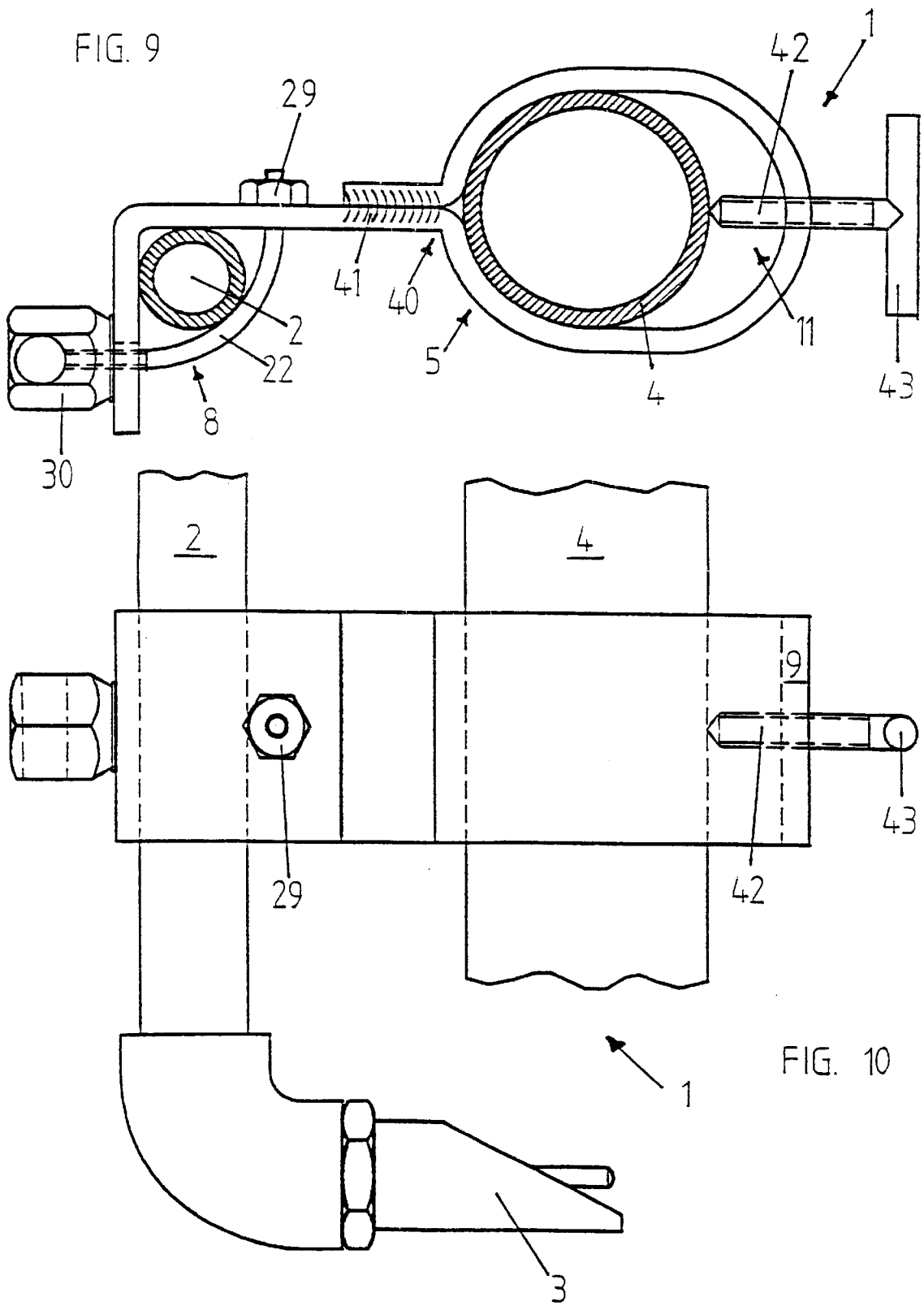

WATERER

BACKGROUND OF THE INVENTION

The invention relates to a device for providing water and food to animals to be mounted on an animal housing facility, which is provided with an essentially vertical feed delivery pipe, a vertical water pipe and at least one water valve fitted on the water pipe.

A large number of device for providing water and food to animals of the type described are used on breeding and fattening farms, for example in the breeding of pigs.

In one method of pig rearing, each pig is provided with a pen. The pen is dimensioned such that it accommodates one pig. A full-grown pig no longer has enough space to turn around in the pen. The pigs stand with their heads at the front ends of the pens. The front ends face an aisle running along the pens, which is used by personnel to service the facility and oversee the animals.

In accordance with a well-known watering method, the floor of the animal housing facility is provided with a trough along the entire length of the front ends of the adjacent pens. On the one hand, the feed is fed into this floor trough via the feed delivery pipes, this process being controlled by an automatic timer at large farms. On the other hand, the drinking water for the animals is also fed into the floor trough. This process is also controlled by an automatic timer at large farms. The disadvantage of this procedure is that water is not available to the animal at all times. The water consumption is also very high and, in warm climates, a watery, sour feed mash accumulates. The additional contamination of the floor trough with feces and the formation of mold fungi cause diseases in the animals. The operating costs are high.

For this reason, breeders switched to mounting a water pipe with a water valve on the animal housing facility, via which the animal can obtain clean drinking water at any time. A generic waterer is welded to a bar of a side grate. The side grate separates two adjacent pens from one another. One water valve is provided which must be used by both animals in the two adjacent pens. In order to eliminate the risk of injury due to an object projecting into the pen, the water valve is positioned parallel to the side grate. This makes it particularly difficult for both animals to reach.

A further disadvantage exists in the fact that, in many cases, one of the animals is more aggressive than its neighbor and makes use of the water valve more frequently, so that one animal can not cover its water requirement. It has also proven difficult for larger pigs to reach the waterer mounted on the side of the pen due to their restricted freedom of movement.

The known waterer is particularly problematic as regards to maintenance and repair work. Since the pigs stand in the pen during normal operation, the waterer is also very difficult for the personnel to reach. The regular maintenance of a large number of waterers of this kind entail an immense amount of work.

Furthermore, a disadvantage is also seen in the fact that a welded joint is envisaged for mounting the waterer, and that the position of the waterer is permanently fixed due to it being welded.

It is impossible in normal daily operation to refit an old farm, which still supplies drinking water via the floor trough, with a waterer which has to be welded between two adjacent pens.

SUMMARY OF THE INVENTION

The invention is based on the task of designing a device for providing water and food to animals which can be easily reached by an animal, which is simple to service, repair, and install in old breeding or fattening farms, and which assists in avoiding aggressive behaviour among the animals.

According to the invention, the task is solved by a mounting unit, at least partially surrounding a feed delivery pipe which can be firmly clamped to the feed delivery pipe, and by a water pipe holder with a strap and an angled leg provided on a mounting unit, where the water pipe lies against the strap and the leg in height-adjustable fashion, and with a height adjustment clamp which surrounds the water pipe and is connected to the strap and the leg, with which the strap, the leg and the height adjustment clamp can be clamped against the water pipe.

The device is particularly simple. It can be mounted on any feed delivery pipe using simple wrenches. As there is no welded joint, it is also particularly suitable for retrofitting on old breeding or fattening farms which still water the animals using the floor trough.

The new waterer mounted on a feed delivery pipe is always mounted in the region of the pig's head, as there is a feed delivery pipe in one or both corners of the front end of the pen. A pig can easily reach the water valve at any time by slightly turning its head. In addition, a device for providing water and food to animals is preferably provided in each pen in order to avoid aggression among the animals. In this way, all the animals can cover their water requirement in a stress-free environment.

The height of the water pipe can be adjusted to accommodate the rapid growth of the pigs. This makes it easy to reposition. Adjustments must be made at relatively short intervals during the rearing of the animals. The correct setting of the height of the water valve above the floor of the animal housing is important, as a water valve that is set too low, for example, prevents the animal from obtaining enough water and causes a high water loss.

In a preferred configuration, the mounting unit has a flat profile, with a concave surface in contact with the feed delivery pipe, and is provided with a clamping element which at least partially surrounds the feed delivery pipe. The concave surface establishes a tight fit between the feed delivery pipe and the mounting unit. The clamping element generates large retention forces which firmly hold the waterer on the feed delivery pipe, even when it is knocked by the pig. It is particularly economical and simple to operate when the clamping element has a U-shaped bracket with threads on the two free ends and the flat profile is provided with holes which are penetrated by the threads of the bracket, and when tension nuts are screwed onto the threads. The bracket is a simple and inexpensive standard component. In addition, a bolt or a section of round bar steel can be bent into shape as a makeshift to replace a defective bracket.

For the sake of simplicity, the flat profile is provided with a curved section in contact with the feed delivery pipe in the manner of a pipe clip, and the sections of the flat profile adjacent to the curved section are aligned with one another. This design readily enables a tight fit between the flat profile and the feed delivery pipe, which ensures good retention when clamped tight with the clamping element.

It is particularly favourable when the height adjustment clamp is provided with an angled bolt which passes through a hole provided in the end of the leg and in the strap. The simplicity of the height adjustment clamp makes it particularly easy to adjust the height of the water pipe. Moreover, an inexpensive standard bolt can be used in manufacture. In the event of damage, a correspondingly angled bolt can again be used as a makeshift in this case to repair the height adjustment clamp.

The strap and the leg, and the ends of the bolt, are preferably each positioned at an angle of roughly 90° relative to one another. This design is advantageous for handling, as well as for the manufacture of the waterer. The strap consists of the flat profile of the mounting unit, where one free end of the flat profile is angled, thus forming the leg.

For the sake of simplicity, the end of the bolt passing through the strap, or the end passing through the leg, is provided with an abutment which acts on the strap or then leg, the other end of the bolt being provided with a tension nut. The head of a screw can act as a rigid abutment. However, a bolt with threads on both ends is preferably used, where the abutment is formed by a lock nut screwed onto the corresponding end of the bolt. This results in a variable clamping device which, using the adjustment options afforded by the lock nut, can be adjusted in such a way that water pipes of different diameters can be clamped.

In order to be able to adjust the height of the water valve above the floor of the animal housing facility, only the tension nut need be adjusted on the completely assembled waterer. The lock nut need only be correctly set once during initial installation. Very little work is required to regularly adjust the height of the water valves on numerous waterers of this kind.

In order to simplify the assembly and operation of the waterer, at least the hole in the leg is designed as a slot extending in the radial direction of the water pipe and is open up to the free end of the leg in pocket-like fashion.

When installing the device for providing water and food to animals, the water pipe is positioned against the strap and the leg. The bolt can then be inserted by a simple translatory motion with one end in the hole of the one leg and the other end in the slot of the other leg. The lock nut and the tension nut can then be screwed onto the threaded ends and the water pipe clamped tight.

In order for the tension nut to be adjusted at any time using a conventional wrench, it is provided with an external hexagon profile. The tension nut is even more variable ard easy to adjust when it is additionally provided with a hole transverse to its thread into which a long tool can be inserted. Various different tools can thus be used to adjust the height of the water valve. As a result, a suitable tool is almost always on hand.

In a special configuration, the curved section of the flat profile of the mounting unit and the bracket of the clamping element are designed to be mounted on a feed delivery pipe with an inside diameter of 2 inches.

The invention is described below based on an example illustrated in the associated drawings. The drawings show the following:

BRIEF DESCRIPTION OF THE DRAWINGS

FIG. 1 A cross-sectional top view of the waterer with the feed delivery pipe and the water pipe, FIG. 2 A side view of the waterer according to FIG. 1, FIG. 3 A cross-sectional top view of another configuration of the waterer with the feed delivery pipe and the water pipe, FIG. 4 A side view of the waterer according to FIG. 3, FIG. 5 A cross-sectional top view of another configuration of the waterer with the feed delivery pipe and the water pipe, FIG. 6 A side view of the waterer according to FIG. 5, FIG. 7 A cross-sectional top view of another configuration of the waterer with the feed delivery pipe and the water pipe, FIG. 8 A side view of the waterer according to FIG. 7, FIG. 9 A cross-sectional top view of another configuration of the waterer with the feed delivery pipe and the water pipe, FIG. 10 A side view of the waterer according to FIG. 9.

DESCRIPTION OF THE PREFERRED EMBODIMENTS

Figure 5:
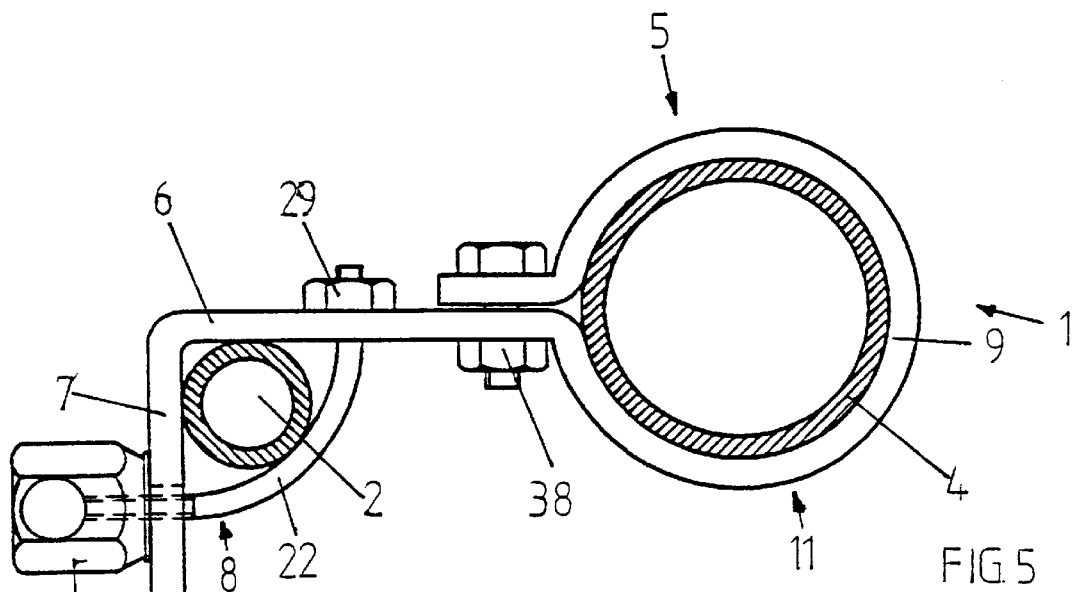
Figure 6:
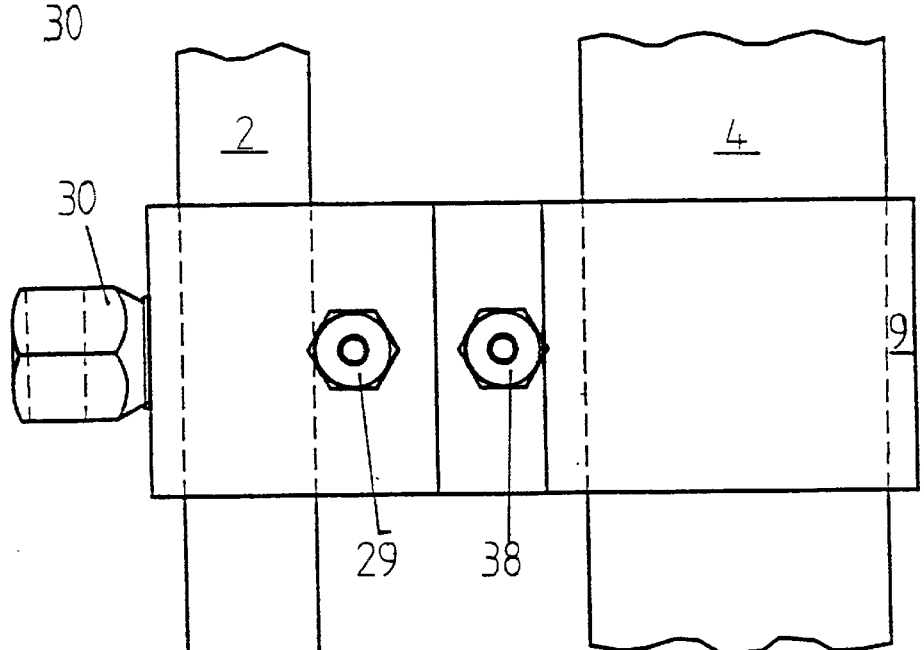

According to the drawing, the device for providing water and food to animals 1 consists of a water pipe 2, running essentially vertically, which is provided with a water valve 3, a mounting unit 5 clamped to feed delivery pipe 4 of an animal housing facility, a water pipe holder provided on mounting unit 5 with a strap 6 and an angled leg 7, and a height adjustment clamp 8, surrounding water pipe 2 and connected to strap 6 and leg 7, which can be used to clamp strap 6, leg 7 and height adjustment clamp 8 to water pipe 2.

Mounting unit 5 has a flat profile 9, a concave section 10 of which is in contact with feed delivery pipe 4. Mounting unit 5 is also provided with clamping element 11, which partially surrounds feed delivery pipe 4.

In the configuration of the waterer illustrated in FIGS. 1 and 2, clamping element 11 has a U-shaped bracket 12 with threads 13 and 14 on both free ends. Flat profile 9 is provided with holes 15 and 16 which are penetrated by threads 13 and 14 of bracket 12. Tension nuts 17 and 18 are screwed onto threads 13 and 14.

As shown in FIG. 1, flat profile 9 has a curved section 19 in contact with feed delivery pipe 4 in the manner of a pipe clip, where sections 20 and 21 adjacent to the curved section of flat profile 9 are aligned with one another. Holes 15 and 16 of flat profile 9 are located in sections 20 and 21. Tension nuts 17 and 18 thus have a level contact surface on flat profile 9, so that a sufficient retention force can be generated.

Height adjustment clamp 8 has an angled bolt 22 which passes through holes 23 and 24 provided in the end section of leg 7 and strap 6. Hole 23 in the end section of leg 7 is designed as a slot 25 extending in the radial direction of water pipe 2 and is open up to free end 26 of leg 7 in pocket-like fashion. Both ends of bolt 22 are provided with threads 27 and 28. Bolt 22 has an abutment in the form of a lock nut 29 on thread 27 passing through strap 6. A tension nut 30 is screwed onto the other end provided with thread 28. To permit the simple use of a wrench, tension nut 30 has an external hexagon profile. In addition, a hole 31 is positioned transverse to the thread of tension nut 30, into which a long tool can be inserted. In this way, tension nut 30 can be adjusted with various different tools. A T-handle (not shown), similar to that on a vice, can also be provided in hole 31, so that tension nut 30 is permanently provided with a tightening tool for adjustment.

Strap 6 and leg 7, and the ends of bolt 22, are each positioned at an angle of roughly 90° relative to one another. FIG. 1 shows that water pipe 2 is clamped at points of contact 32, 33 and 34, distributed around its entire circumference. Points of contact 32 and 33 between water pipe 2 and strap 6 and leg 7 extend over the entire height h of flat profile 9. In this practical example, height h is roughly twice as large as the diameter of water pipe 2. Point of contact 34 has a smaller linear contact surface. It extends in the circumferential direction of water pipe 2.

The configuration of the device for providing water and food to animals illustrated in FIGS. 3 and 4 displays a mounting unit 5 with a clamping element 11 in the form of a pipe clip 35. In this case, height k of the pipe clip corresponds to height h of flat profile 9. The pipe clip is mounted on flat profile 9 with two through-bolt connections 36 and 37, each consisting of a bolt and a nut. The pipe clip surrounds the feed delivery pipe through an angle of about 180° and is in very tight contact with it. High retention forces can be achieved. Height adjustment clamp 8 corresponds to the height adjustment clamp according to FIG. 1.

The configuration of the device for providing water and food to animals in FIG. 5 involves a waterer with a mounting unit 5 which is preferably slid on from one end of feed delivery pipe 4 and tightly clamped in the appropriate position using through-bolt connection 38. In this context, the feed delivery pipe is virtually surrounded through 360°, so that particularly large retention forces can be achieved. Height adjustment clamp 8 corresponds to the height adjustment clamp according to FIG. 1.

FIGS. 7 and 8 show a configuration of the device having a mounting unit 5 with a clamping mechanism 44 to tightly clamp the waterer to a feed delivery pipe 4. Feed delivery pipe 4 is completely surrounded by flat profile 9 in such a way that the flat profile forms a closed loop which is slightly larger than feed delivery pipe 4 and forms a space between feed delivery pipe 4 and the flat profile. A clamping block 39 is provided in the space. Flat profile 9 also has a female thread in the region of the space, into which a bolt 42 is screwed by which clamping block 39 is clamped against feed delivery pipe 4. Bolt 42 is provided with a handle 43 and can thus be tightened without the help of a tool. In order to prevent the loop of flat profile 9, surrounding feed delivery pipe 4, from opening when tensioning clamping block 39, free end 40 of flat profile 9 is welded to the strap 6 section of flat profile 9 via a welded joint 41. Of course, other connections, such as a bolt connection, are also feasible instead of welded joint 41.

Height adjustment clamp 8 corresponds to the height adjustment clamp according to FIG. 1.

FIGS. 9 and 10 show a final configuration. A mounting unit 5 with a clamping mechanism 44 is also provided in this case to firmly clamp the waterer to a feed delivery pipe 4. Feed delivery pipe 4 is completely surrounded by flat profile 9 in such a way that flat profile 9 forms a closed loop which is slightly larger than feed delivery pipe 4 and forms a space between feed delivery pipe 4 and flat profile 9. Flat profile 9 has a female thread in the region of the space, into which a bolt 45 with a pointed end is screwed. In this context, the pointed end of bolt 45 presses against feed delivery pipe 4, clamping the waterer against it. Bolt 45 is provided with a handle 46 and can thus be tightened without the help of a tool. In order to prevent the loop of flat profile 9, surrounding feed delivery pipe 4, from opening when tensioning, the free end of flat profile 9 is welded to the strap 6 section of flat profile 9 via a welded joint 41. Of course, other connections, such as a bolt connection, are also feasible instead of welded joint 41. Height adjustment clamp 8 corresponds to the height adjustment clamp according to FIG. 1.

Although a preferred embodiment of the invention has been specifically illustrated and described herein, it is to be understood that mirror variations may be made in the apparatus without departing from the spirit and scope of the invention, as defined the appended claims.

What is claimed is:

1. A device for providing food and water to animals mounted on an animal housing facility, said device with an essentially vertical feed delivery pipe (4), a vertical water pipe (2) and at least one water valve (3) fitted on the water pipe (2), said device characterised by a mounting unit (5), at least partially surrounding the feed delivery pipe (4), which can be firmly clamped to the feed delivery pipe (4), and by a water pipe holder with a strap (6) and an angled leg (7) provided on the mounting unit (5), where the water pipe (2) lies against the strap (6) and the leg (7) in height-adjustable fashion, and with a height adjustment clamp (8) which surrounds the water pipe (2) and is connected to the strap (6) and the leg (7), with which the strap (6), the leg (7) and the height adjustment clamp (8) can be clamped against the water pipe (2).

2. A device for providing food and water to animals as per claim 1, characterised in that the mounting unit (5) has a flat profile (9), with a concave surface (10) in contact with the feed delivery pipe (4), and is provided with a clamping element (11) which at least partially surrounds the feed delivery pipe (4).

3. A device for providing food and water to animals as per claim 2, characterised in that the clamping element (11) has a U-shaped bracket (12) with threads (13, 14) on the two free ends, in that the flat profile (9) is provided with holes (15, 16) which are penetrated by the threads (13, 14) of the bracket (12), and in that tension nuts (17, 18) are screwed onto the threads (13, 14).

4. A device for providing food and water to animals as per claim 2, characterised in that the flat profile (9) is provided with a curved section (19) in contact with the feed delivery pipe (4) in the manner of a pipe clip, and in that the sections (20, 21) of the flat profile (9) adjacent to the curved section (19) are aligned with one another.

5. A device providing food and water to animals as per claim 1, characterised in that the height adjustment clamp (8) is provided with an angled bolt (22) which passes through a hole (23, 24) provided in the end of the leg (7) and in the strap (6).

6. A device for providing food and water to animals as per claim 5, characterised in that the strap (6) and the leg (7), and the ends of the bolt (22), are preferably each positioned at an angle of roughly 90° relative to one another.

7. A device for providing food and water to animals as per claim 6, characterised in that the end of the bolt (22) passing through the strap (6), or the end passing through the leg (7), is provided with an abutment which acts on the strap (6) or the leg (7), the other end of the bolt (22) being provided with a tension nut (30).

8. A device for providing food and water to animals as per claim 7, characterised in that the abutment is formed by a lock nut (29) screwed onto the corresponding end of the bolt (22).

9. A device for providing food and water to animals as per claim 8, characterised in that at least the hole (23) in the leg (7) is designed as a slot extending in the radial direction of the water pipe (2) and is open up to the free end (26) of the leg (7) in pocket-like fashion.

10. A device for providing food and water to animals as per claim 9, characterised in that the tension nut (30) is provided with a hexagon profile to accommodate a wrench.

11. A device for providing food and water to animals as per claim 10, characterised in that the tension nut (30) is provided with a hole (31) transverse to its thread into which a long tool can be inserted.

12. A device for providing food and water to animals as per claim 11, characterised in that the curved section (19) of the flat profile (9) and the bracket (12) of the clamping element (11) are designed to be mounted on a feed delivery pipe (4) with an inside diameter of 2 inches.

* * * * *